(12) United States Patent
Duan (10) Patent No.: US 11,954,394 B2
(45) Date of Patent: Apr. 9, 2024

(54) SPLICING SCREEN AND CONTROL METHOD AND SYSTEM THEREOF

(71) Applicant: BOE Technology Group Co., Ltd., Beijing (CN)

(72) Inventor: Ran Duan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/690,447

(22) Filed: Mar. 9, 2022

(65) Prior Publication Data

US 2022/0317962 A1    Oct. 6, 2022

(30) Foreign Application Priority Data

Mar. 31, 2021 (CN) .......................... 202110349544.9

(51) Int. Cl.
*G06F 3/14* (2006.01)
*G06F 3/0484* (2022.01)
*G06F 3/147* (2006.01)

(52) U.S. Cl.
CPC .......... *G06F 3/1407* (2013.01); *G06F 3/0484* (2013.01); *G06F 3/147* (2013.01); *G06F 2203/04803* (2013.01)

(58) Field of Classification Search
CPC .......................... G09G 2300/026; G09G 5/12
See application file for complete search history.

(56) References Cited

U.S. PATENT DOCUMENTS

| | | | |
|---|---|---|---|
| 9,003,514 B1* | 4/2015 | Nuthi ....................... | G06F 21/35 725/39 |
| 2008/0250149 A1* | 10/2008 | Morris .................... | H04L 67/54 709/229 |
| 2012/0119977 A1* | 5/2012 | Asami ..................... | G09F 3/208 345/1.3 |
| 2014/0143886 A1* | 5/2014 | Eversoll .................. | G06F 21/60 726/27 |
| 2015/0058748 A1* | 2/2015 | Huang .................. | G06F 3/0481 715/753 |
| 2016/0062725 A1* | 3/2016 | Odagiri ................. | G06F 3/1446 345/1.3 |
| 2017/0251260 A1* | 8/2017 | Sanders ........... | H04N 21/47217 |
| 2019/0043446 A1* | 2/2019 | Suzuki .................. | G06F 3/1431 |
| 2020/0184929 A1* | 6/2020 | Liu ........................ | G06F 3/1454 |
| 2021/0042081 A1* | 2/2021 | Mihara ................. | G06F 3/1446 |
| 2021/0164197 A1* | 6/2021 | Roberts ..................... | E02F 9/24 |
| 2021/0375231 A1* | 12/2021 | Kim ....................... | G06F 3/1446 |

* cited by examiner

*Primary Examiner* — William Boddie
*Assistant Examiner* — Alecia D English
(74) *Attorney, Agent, or Firm* — IPro, PLLC (57) ABSTRACT

The present disclosure provides a splicing screen and a control method and system thereof. The splicing screen includes a display panel. A communication unit is configured to receive display data and receive a ready command sent by a slave splicing screen of the splicing screen; a control unit is configured to control, in response to determining that the splicing screen is ready and receiving the ready command, the communication unit to send a specified play command to the slave splicing screen, where the specified play command instructs to play a specified play frame in the display data at a specified play moment; and control the display panel to display the specified play frame at the specified play moment.

13 Claims, 5 Drawing Sheets

SPLICING SCREEN AND CONTROL METHOD AND SYSTEM THEREOF

CROSS-REFERENCE TO RELATED APPLICATION

The present disclosure claims priority to Chinese Patent Application with Application No. 202110349544.9, filed on Mar. 31, 2021 and entitled "SPLICING SCREEN AND CONTROL METHOD AND SYSTEM THEREOF", which is incorporated herein by reference in its entirety.

TECHNICAL FIELD

This disclosure relates to the field of display technologies, and in particular, relates to a splicing screen and a control method and system thereof.

BACKGROUND

Currently, a main implementation of a splicing display module is to control a plurality of splicing screens through a splicer to realize the splicing and playback of a plurality of splicing screens.

SUMMARY

Embodiments of the present disclosure provide a splicing screen and a control method and system thereof.

According to a first aspect of embodiments of the present disclosure, a splicing screen is provided and includes:
a display panel;
a communication unit, configured to receive display data and receive a ready command sent by a slave splicing screen of the splicing screen; and
a control unit, configured to control, in response to determining that the splicing screen is ready and receiving the ready command, the communication unit to send a specified play command to the slave splicing screen, where the specified play command instructs to play a specified play frame in the display data at a specified play moment; and control the display panel to display the specified play frame at the specified play moment.

According to a second aspect of embodiments of the present disclosure, a splicing screen is provided and includes:
a display panel;
a communication unit, configured to receive display data and receive a specified play command, where the specified play command instructs to play a specified play frame in the display data at a specified play moment and is sent by a master splicing screen to which the splicing screen belongs upon determining that the master splicing screen is ready and receiving a ready command sent by a slave splicing screen of the master splicing screen; and
a control unit configured to control, based on the specified play command, the display panel to display the specified play frame at the specified play moment.

According to a third aspect of embodiments of the present disclosure, a splicing screen system is provided and includes: a control device and a plurality of splicing screens, where
the control device is configured to determine data to-be-displayed, obtain display data of each splicing screen by splitting the data to-be-displayed based on a quantity of splicing screens contained in the splicing screen system; and send the display data to corresponding splicing screens;
the plurality of splicing screens include a master splicing screen and at least one slave splicing screen;
the slave splicing screen is configured to receive the display data sent by the control device and send a ready command to the master splicing screen;
the master splicing screen is configured to receive the display data sent by the control device; receive the ready command sent by the slave splicing screen; send a specified play command to the slave splicing screen in response to determining that the master splicing screen is ready and receiving the ready command, where the specified play command instructs to play a specified play frame in the display data at a specified play moment; and display the specified play frame at the specified play moment;
the slave splicing screen is further configured to receive the specified play command; and
display the specified play frame at the specified play moment based on the specified play command.

According to a fourth aspect of embodiments of the present disclosure, a method for controlling a splicing screen is provided and the method includes:
receiving display data;
receiving, in response to determining that the splicing screen is ready, a ready command sent by a slave splicing screen of the splicing screen;
sending a specified play command to the slave splicing screen, where the specified play command instructs to play a specified play frame in the display data at a specified play moment; and
playing the specified play frame at the specified play moment.

According to a fifth aspect of embodiments of the present disclosure, a method for controlling a splicing screen is provided and the method includes:
receiving display data;
receiving a specified play command, where the specified play command instructs to play a specified play frame in the display data at a specified play moment, and the specified play command is sent by a master splicing screen to which the splicing screen belongs, upon determining that the master splicing screen is ready and receiving a ready command sent by a slave splicing screen of the master splicing screen; and
playing the specified play frame at the specified play moment based on the specified play command.

BRIEF DESCRIPTION OF THE DRAWINGS

In order to describe the technical solutions in the present disclosure or relevant technologies more clearly, the following briefly introduces the accompanying drawings required for describing the embodiments or relevant technologies. Apparently, the accompanying drawings in the following description show merely some embodiments of the present disclosure, and those of ordinary skill in the art may also derive other drawings from these accompanying drawings without creative efforts.

DETAILED DESCRIPTION

In order to make the objectives, technical solutions, and advantages of the present disclosure clearer, the following further describes the present disclosure in detail in conjunction with specific embodiments and with reference to the accompanying drawings.

It should be noted that, unless otherwise defined, the technical or scientific terms used in the embodiments of the present disclosure should be in the ordinary meaning understood by those of ordinary skills in the art to which the present disclosure belongs. The "first", "second" and similar words used in the embodiments of the present disclosure do not indicate any order, quantity, or importance, but are only used to distinguish different components. "Comprise" or "include" and other similar words mean that the element or item appearing before the word encompasses the element or item listed after the word and its equivalents, but does not exclude other elements or items.

In relevant technologies, a splicing screen generally adopts wired mode to realize data transmission. However, since the wired way of splicing play requires splicer control, it is more complicated to implement and inconvenient to use. If the splicing is realized in a wireless way, there will be a problem of signal synchronization between the splicing screens.

Embodiments of the present disclosure provide a splicing screen and a method and system for controlling the splicing screen.

In some embodiments, the splicing screen includes: a display panel; a communication unit configured to receive display data and receive a ready command sent by a slave splicing screen of the splicing screen; and a control unit configured to control, in response to determining that the splicing screen is ready and receiving the ready command, the communication unit to send a specified play command to the slave splicing screen, where the specified play command instructs to play a specified play frame in the display data at a specified play moment; and control the display panel to display the specified play frame at the specified play moment.

One of the splicing screens is set as a master splicing screen and other splicing screens are set as slave splicing screens, such that the master splicing screen can realize signal synchronization with the slave splicing screens by means of a specified play command, and there's no need to set a splicing screen controller (or splicer), which is more convenient to implement.

In other embodiments, the splicing screen includes a communication unit, a first control unit, a second control unit and a display panel. Wherein the communication unit is configured to receive display data; the first control unit is configured to send the display data to the second control unit; control, in response to the splicing screen and a slave splicing screen of the splicing screen being ready, the communication unit to send a time calibration command to the slave splicing screen, and receive, from the communication unit, time calibration completion information sent by the slave splicing screen; send a specified play command to the slave splicing screen, where the specified play command includes a specified play moment and a specified play frame; and send, based on the specified play command, a display command of playing the specified play frame at the specified play moment to the second control unit; and the second control unit is configured to acquire the display data and process the display data based on the display command; and the display panel is configured to display the display data under control of the second control unit.

In other embodiments, the splicing screen includes a communication unit, a first control unit, a second control unit and a display panel. Wherein the communication unit is configured to receive display data; the first control unit is configured to send the display data to the second control unit; control, in response to receiving a ready command sent by the second control unit, the communication unit to receive a time calibration command sent by a master splicing screen to which the splicing screen belongs; complete time calibration based on the time calibration command and send time calibration completion information to the master splicing screen; control the communication unit to receive a specified play command sent by the master splicing screen, where the specified play command includes a specified play moment and a specified play frame; and send, based on the specified play command, a display command of playing the specified play frame at the specified play moment to the second control unit; the second control unit is configured to acquire the display data and process the display data based on the display command; and the display panel is configured to display the display data under control of the second control unit.

In a splicing screen and a method and system for controlling the splicing screen provided by embodiments of the present disclosure, one of the splicing screens is set as a master splicing screen and other splicing screens are set as slave splicing screens, such that the master splicing screen can realize signal synchronization with the slave splicing screens by means of a time calibration command and a specified play command, and there's no need to set a splicing screen controller (or splicer), which is more convenient to implement. Meanwhile, based on the means of signal synchronization, the splicing screen can be completed by wireless communication, eliminating the need for wired connections between devices and making it easier to use.

Figure 1:
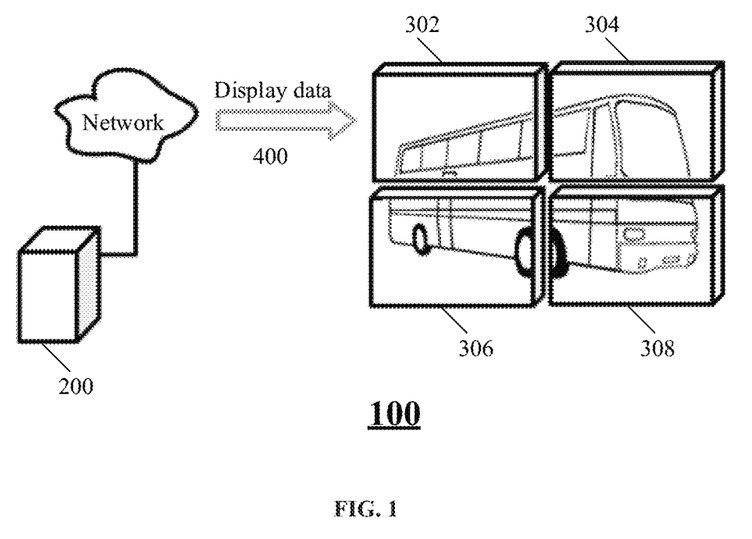
FIG. 1 is a schematic diagram of a splicing screen system according to some embodiments of the present disclosure.

FIG. 1 is a schematic diagram of a splicing screen system 100 according to some embodiments of the present disclosure.

As shown in FIG. 1, the system 100 may include a control device 200 and a plurality of splicing screens. In FIG. 1, the quantity of splicing screens is 4 for exemplary. The system 100 may include a splicing screen 302, a splicing screen 304, a splicing screen 306, and a splicing screen 308. The control device 200 and the splicing screens 302, 304, 306, and 308 can communicate over a wired network or a wireless network. In some embodiments, for the convenience of realization, a wireless network can be used for communication between the control device 200 and the splicing screens 302, 304, 306, and 308.

Figure 2:
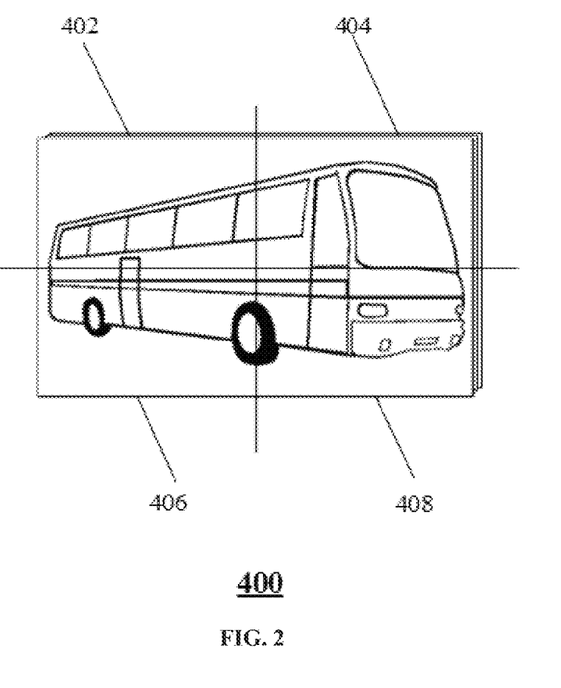
FIG. 2 is a schematic diagram of data to-be-displayed according to some embodiments of the present disclosure.

FIG. 2 is a schematic diagram of data to-be-displayed 400 according to some embodiments of the present disclosure.

As shown in FIG. 2, the control device 200 may first determine the data to-be-displayed 400, then divide the data to-be-displayed 400 according to the quantity of splicing screens (for example, 4) to obtain the display data (for example, display data 402, 404, 406, 408) that each splicing screen needs to display, and send the display data to corresponding splicing screens (for example, the display data 402 is sent to the splicing screen 302, the display data 404 is sent to the splicing screen 304, the display data 406 is sent to the splicing screen 306, and the display data 408 is sent to the splicing screen 308).

In some embodiments, the control device 200 can be a server applied to the splicing screen, and the splicing screens 302, 304, 306, and 308 can download the corresponding display data 402, 404, 406, and 408 from the control device 200 over the Internet. In other embodiments, the control device 200 may be a terminal device and can upload the display data 402, 404, 406, and 408 to a streaming media server over the Internet (not shown), and then the splicing screens 302, 304, 306, and 308 may download the corresponding display data 402, 404, 406, and 408 from the streaming media server over the Internet.

The data to-be-displayed 400 may be sent to the control device 200 via other devices, or may be pre-stored in the control device 200, or may be downloaded by a user from the Internet via the control device 200. The specific implementation is not limited herein.

Figure 3:
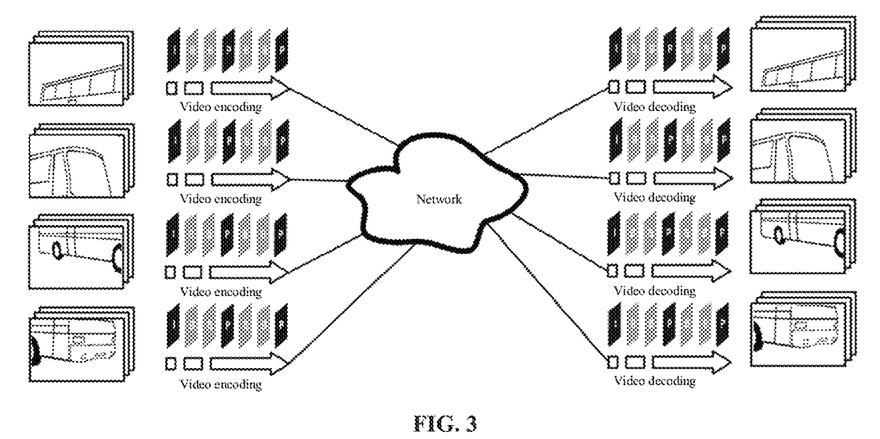
FIG. 3 is a schematic diagram showing a distribution process of data to-be-displayed according to some embodiments of the present disclosure.

FIG. 3 is a schematic diagram showing a distribution process of data to-be-displayed 400 in the system 100 according to some embodiments of the present disclosure. Referring to FIG. 3, in some embodiments, the control device 200 may first encode the display data 402, 404, 406, and 408, and then send them to corresponding splicing screens 302, 304, 306, and 308. After the splicing screens 302, 304, 306, and 308 receive the encoded display data 402, 404, 406, and 408, they can decode the display data 402, 404, 406, and 408 before performing other processing.

In some embodiments, as shown in FIGS. 2 and 3, taking a 2×2 splicing screen as an example, the control device 200 can cut the data to-be-displayed 400 and divide it into 4 parts evenly. Video encoding is performed on each part separately, including but not limited to standard or non-standard encoding methods such as H.264, H.265, AVS2, etc. After the encoding is completed, the corresponding compressed video streams are sent to the IP addresses of the four splicing screens 302, 304, 306, and 308 at the same time.

Exemplarily, the IP addresses of the four splicing screens 302, 304, 306, and 308 may be pre-configured in the control device 200, or sent to the control device 200 via the splicing screen.

In some embodiments, a master splicing screen of a plurality of splicing screens can be first determined and used for control and signal synchronization of other splicing screens. Other splicing screens can be used as slave splicing screens of the master splicing screen and complete signal synchronization under control of the master splicing screen.

Figure 4:
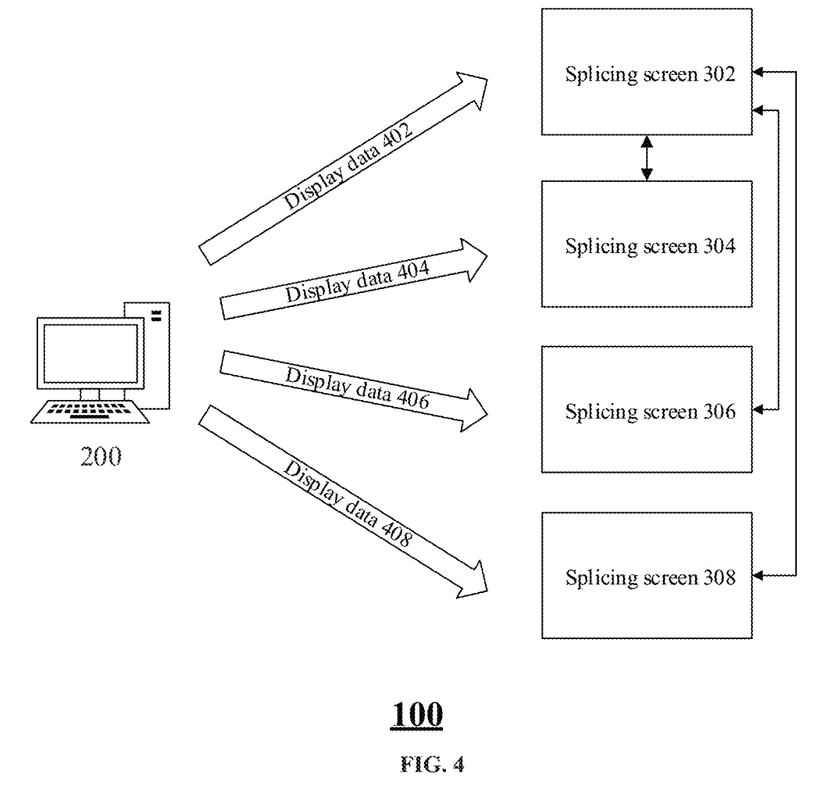
FIG. 4 is another schematic diagram of a splicing screen system according to some embodiments of the present disclosure.

FIG. 4 is another schematic diagram of a splicing screen system 100 according to some embodiments of the present disclosure. As shown in FIG. 4, the splicing screen 302 may be set as a master splicing screen, and the splicing screens 304, 306, and 308 may be set as slave splicing screens of the splicing screen 302. It can be understood that the master splicing screen and the slave splicing screen can be determined in any way, as long as the identity of each splicing screen can be distinguished. In some embodiments, a master splicing screen can be determined according to the pre-set selected rules. For example, splicing screens may be numbered, and the smallest or largest number is used as a master splicing screen. The specific setting rules can be designed according to needs, which is not specifically limited herein.

Figure 5:
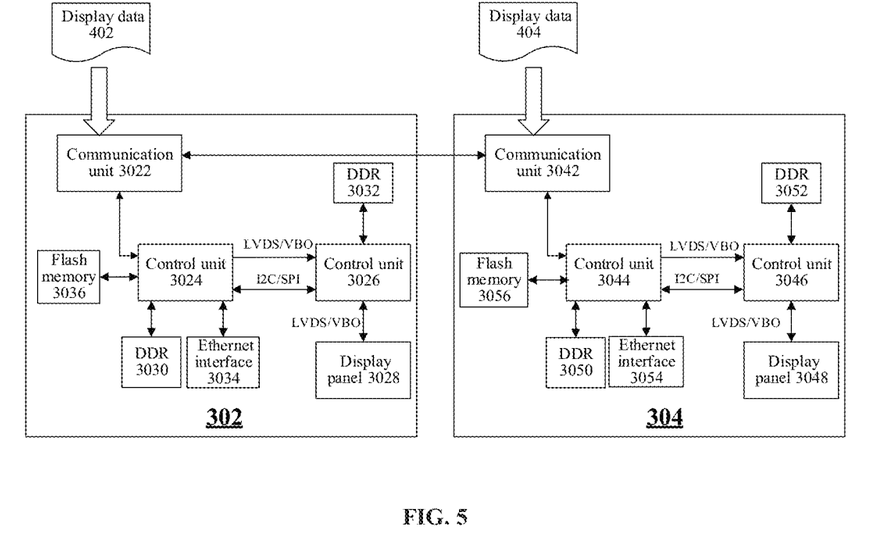
FIG. 5 is a schematic diagram showing interaction between a master splicing screen and a slave splicing screen according to some embodiments of the present disclosure.

FIG. 5 is a schematic diagram showing interaction between a master splicing screen 302 and a slave splicing screen 304 according to some embodiments of the present disclosure.

As shown in FIG. 5, the splicing screen 302 may include a communication unit 3022, a control unit 3024, a control unit 3026, and a display panel 3028. In some embodiments, the communication unit 3022 may be a wired communication module and its data interface for establishing a communication connection with the splicing screen 304 via a corresponding data line. In other embodiments, the communication unit 3022 may be a wireless communication unit, for example, a 3G module, a 4G module, a 5G module, a Bluetooth module, a Narrow Band Internet of Things (NB-IoT) module, etc. It is more convenient to realize data interaction through wireless communication. The communication unit 3022 may receive the display data 402 sent by the control device 200, and can also send control commands to the splicing screens 304, 306, and 308 and receive information returned by the splicing screens 304, 306, and 308.

The control of the splicing screen 302 is mainly completed by the control unit 3024 and the control unit 3026.

In some embodiments, the control unit 3024 may be a system on chip (SoC for short). Usually, there is an ARM inside the SoC as a CPU control, and some IP cores can realize image processing functions, and the SoC can also include external input and output interfaces. SoC is a drive unit that can be used independently for display screens. In some embodiments, the control unit 3024 may receive the display data 402 (for example, the segmented video stream) via the communication unit 3022 and communicate with other splicing screens to control the simultaneous actions of all splicing screens.

In some embodiments, the control unit 3026 may be a field programmable gate array (FPGA for short). FPGA is a unique device that can be flexibly configured. FPGA is good at processing large amounts of image data in parallel and can be programmed flexibly according to functional requirements. In some embodiments, FPGA can be used as frame synchronization control.

In some embodiments, as shown in FIG. 5, the control unit 3024 may use low-voltage differential signaling (LVDS for short) or VBO (V-by-One) to send the display data 402 to the control unit 3026. In some embodiments, as shown in FIG. 5, the control unit 3024 may use the I2C interface protocol or the serial peripheral interface protocol (SPI for short) to realize interaction of frame control information or other data and instructions with the control unit 3026.

In some embodiments, as shown in FIG. 5, the control unit 3026 may use low-voltage differential signaling (LVDS for short) or VBO (V-by-One) to send the display data 402 to the display panel 3028.

The display panel 3028 may be any display panel with a display function. For example, a liquid crystal display panel, an organic light emitting diode display panel, a light emitting diode display panel, and so on.

In some embodiments, as shown in FIG. 5, the splicing screen 302 may also include a memory (for example, double-rate synchronous dynamic random access memory, DDR for short) 3030, a memory (for example, DDR) 3032, an Ethernet interface 3034, and a flash memory 3036.

As shown in FIG. 5, similarly, the splicing screen 304 may include a communication unit 3042, a control unit 3044, a control unit 3046, and a display panel 3048. In some embodiments, as shown in FIG. 5, the splicing screen 304 may include a memory (for example, double-rate synchronous dynamic random access memory (DDR for short)) 3050, a memory (for example, DDR) 3052, an Ethernet interface 3054, and a flash memory 3056. Each unit in the splicing screen 304 has basically the same function and implementation as its corresponding unit in the splicing screen 302, which will not be repeated herein.

Taking the splicing screen 302 as the master splicing screen and the splicing screen 304 as the slave splicing screen as examples, in conjunction with FIG. 4, an interaction process between the master splicing screen 302 and the slave splicing screen 304 is described.

The control unit 3024 of the splicing screen 302 can acquire display data 402 from a streaming server via the communication unit 3022. At the same time, the control unit 3044 of the splicing screen 304 can also acquire the display data 404 from the streaming media server via the communication unit 3042.

After the control unit 3024 of the splicing screen 302 receives the display data 402, it can be cached in DDR 3030. Subsequently, the control unit 3024 may send the display data 402 to the control unit 3026. After receiving the display data 402, the control unit 3026 may first decode the display data 402 and cache it in the DDR 3032. Moreover, the control unit 3026 may also record the amount of data buffered in the DDR 3032 (for example, the number of frames of a video stream) in real time, which can be recorded as $F_{DDR}$.

After sending a certain amount of display data 402 to the control unit 3026, the control unit 3024 may determine whether the control unit 3026 is ready and whether the slave splicing screen (for example, the splicing screens 304, 306, 308) is ready.

Due to network, system freeze or other reasons, the control unit 3024 may be blocked from sending the video stream to the control unit 3026, such that the amount of data stored in the DDR 3032 of the control unit 3026 is less than a first threshold $F_{MIN}$. The control unit 3026 is not ready to start processing display data. Therefore, in some embodiments, the control unit 3026 may determine whether it is ready by judging whether the amount of data in DDR 3032 is lower than the first threshold $F_{MIN}$. If the amount of data in DDR 3032 is lower than the first threshold $F_{MIN}$, the control unit 3026 can send a not-ready command to the control unit 3024. After receiving the not-ready command sent by the control unit 3026, the control unit 3024 may determine that the control unit 3026 is not ready (that is, the splicing screen 302 is not ready). Alternatively, after receiving the ready command sent by the control unit 3026, the control unit 3024 may consider that the control unit 3026 is ready (that is, the splicing screen 302 is ready). The first threshold is the lower limit of the storage threshold of DDR 3032 (for example, 10 frames). If the amount of data in DDR 3032 is lower than the first threshold $F_{MIN}$, it is considered that the control unit 3026 is not ready. In some embodiments, in the case that each splicing screen starts to play corresponding display data, in response to detecting in real time that the control unit 3026 is not ready, the control unit 3024 can also control the communication unit 3022 to send a play stop command to the splicing screens 304, 306, and 308 based on the not-ready command, which prevents display abnormality caused by network, system freeze or other reasons, and ensures synchronous display effects.

While determining whether the splicing screen 302 is ready, it is also necessary to determine whether the slave splicing screens 304, 306, and 308 of the splicing screen 302 are ready. Similarly, whether the splicing screen 304 is ready is also achieved by judging whether the data amount of the display data 404 stored in the DDR 3052 of the control unit 3046 is lower than the first threshold $F_{MIN}$, which will not be repeated herein. Similarly, it can be judged whether the splicing screens 306 and 308 are ready. In some embodiments, the control unit 3024 of the splicing screen 302 can detect whether the not-ready command sent by the slave splicing screens 304, 306, and 308 is received based on the predetermined time interval, and then determine whether the splicing screens 304, 306, and 308 are not ready. In some embodiments, in the case that each splicing screen has started to play the corresponding display data, in response to detecting in real time that any one of the splicing screens 304, 306, 308 is not ready, the control unit 3024 of the splicing screen 302 can control the communication unit 3022 to send a play stop command to the splicing screens 304, 306, and 308, which prevents display abnormality caused by network, system freeze or other reasons, and ensure synchronous display effect.

In some embodiments, when the amount of data stored in DDR 3032 is greater than a second threshold $F_{MID1}$, the control unit 3026 can send the ready command to the control unit 3024. The second threshold $F_{MID1}$ is a first intermediate value (for example, 20 frames) of the DDR storage threshold, and the second threshold $F_{MID1}$ is greater than the first threshold $F_{MIN}$. After the control unit 3024 receives the ready command, it can be determined that the splicing screen 302 is ready. Similarly, the splicing screens 304, 306, and 308 can also be used in a similar manner to determine whether they are ready, which will not be repeated herein.

In some embodiments, if the splicing screen 302 and the slave splicing screens 304, 306, and 308 are ready, the control unit 3024 can control the communication unit 3022 to send a time calibration command to the slave splicing screens 304, 306, and 308. The slave splicing screens 304, 306, and 308 can complete time calibration based on the time calibration command. In some embodiments, the control unit 3024 may control the communication unit 3022 to periodically send the time calibration command to the slave splicing screens 304, 306, and 308 to ensure that each of the slave splicing screens can complete time calibration based on the time calibration command, which then prepares for the subsequent display synchronization. In some embodiments, the time calibration command may be implemented in the form of a heartbeat packet. For example, the local time of the splicing screen 302 is carried in the time calibration command.

After receiving the time calibration command, the slave splicing screens 304, 306, and 308 can complete the time calibration based on the time calibration command, and then return time calibration completion information to the splicing screen 302 to indicate that the slave splicing screens have completed the time calibration. For example, after receiving the time calibration command, the slave splicing screens 304, 306, and 308 judges whether the difference between the local time of the slave splicing screens 304, 306, 308 and the time in the time calibration command exceeds a threshold. If the difference value exceeds the threshold, the local time is corrected to the time in the time calibration command, and then the time calibration completion information is returned to the splicing screen 302. If the difference value does not exceed the threshold, the time calibration completion information is directly returned to the splicing screen 302.

The control unit 3024 of the splicing screen 302 receives the time calibration completion information sent by the slave splicing screen 304, 306, and 308 from the communication unit 3022, and determines that the play synchronization can be started. Then, the control unit 3024 can control the communication unit 3022 to send the specified play command to the slave splicing screens 304, 306, and 308, and the specified play command instructs to play the specified play frame at the specified play moment. Exemplarily, the specified play command may include the specified play moment (for example, a certain year, a certain day, a certain hour, a certain minute and a certain second) and the specified play frame (for example, the nth frame in the display data received by each splicing screen).

In other embodiments, after it is determined that the splicing screen 302 and the slave splicing screens 304, 306, and 308 are ready, the play synchronization can be started directly. That is, after it is determined that the splicing screen 302 and the slave splicing screens 304, 306, and 308 are ready, the control unit 3024 may control the communication unit 3022 to send a specified play command to the slave splicing screens 304, 306, and 308.

In some embodiments, the specified play command may further include calibrated time stamp information of each frame after the specified play frame of the display data starts and the action execution time of each frame. Here, the calibrated time stamp information can be used to indicate the time when the splicing screen 302 sends the specified play command.

When the specified play moment arrives, the control unit 3024 of the splicing screen 302 can send a display command of playing the specified play frame to the control unit 3026. At the same time, the control unit 3044 of the splicing screen 304 can also send a display command for playing the specified play frame to the control unit 3046. Similarly, the splicing screens 306 and 308 can also be processed similarly, which will not be repeated herein.

At this time, the control unit 3026 receives the display command and can process the display data 402 based on the display command, that is, extract data from the specified play frame from the DDR 3032 and control the display panel 3028 to start playing the display data 402 from the specified play frame. Meanwhile, the control unit 3046 of the splicing screen 304 can also receive the display command and process the display data 404 based on the display command, that is, extract data from the specified play frame from the DDR 3052 and control the display panel 3048 to start playing the display data 404 from the specified play frame. Similarly, the splicing screens 306 and 308 can also be processed similarly, which will not be repeated herein. In some embodiments, if the splicing screens 302, 304, 306, and 308 are all in the initial startup state, the specified play frame may be the first frame of display data.

In some embodiments, the control unit 3026 may also mark the current playing frame and record the number of frames of the display data 402 stored in the DDR 3032. In some embodiments, the control unit 3026 may also determine the corresponding frame number of the display data 402 stored in the DDR 3032 by the specified play frame based on the aforementioned display command, combined with the marked current play frame, such that the corresponding frame can be accurately extracted from the DDR 3032 for playing.

Similarly, the control unit 3046 of the splicing screen 304 can also mark the current playing frame and record the number of frames of the display data 404 stored in the DDR 3052. In some embodiments, the control unit 3046 may also determine the frame number of the display data 404 stored in the DDR 3052 corresponding to the specified play frame based on the aforementioned display command and combined with the marked current playback frame, such that the corresponding frame can be accurately extracted from the DDR 3052 for playing.

In some embodiments, during the aforementioned process from receiving display data 402 to the final playing, the control unit 3024 of the master splicing screen 302 periodically obtains the status information of whether the control unit 3026 is ready and the status information of whether the slave splicing screens 304, 306, and 308 are ready. As long as any one of them is not ready, the control unit 3024 of the master splicing screen 302 sends a play stop command to the control unit 3026 and to the slave splicing screens 304, 306, and 308 via the communication unit 3022 until the splicing screen is ready, and the time calibration command and the specified play command are resent to complete the time calibration and display synchronization again. It can be known that during this process, the slave splicing screen 304, 306, and 308 periodically check whether they are ready and feed back the corresponding status information to the master splicing screen 302, so as to make the master splicing screen 302 obtain the status of the slave splicing screens 304, 306, and 308.

In some embodiments, the splicing screen 302 re-calibrates the time every predetermined time interval (for example, taking 500 frames as a standard interval, which is $F_{interval}$), and calculates that that the $F_{interval}+t_\Delta$ frame (such as $t_\Delta=10$ frame) should be played at xx hour, xx minute, xx second, and xx millisecond. Then the splicing screen 302 can broadcast to the slave splicing screens 304, 306, and 308 an instruction to synchronously play the $F_{interval}+t_\Delta$ frame at the specified moment. The slave splicing screens 304, 306, and 308 will perform time calibration again at the predetermined time interval (for example, taking 500 frames as a standard interval, which is $F_{interval}$) and play the $F_{interval}+t_\Delta$ frame synchronously at the specified moment based on the instruction of the splicing screen 302.

That is, in some embodiments, the first control unit 3024 is further configured to control, based on the predetermined time interval, the communication unit 3022 to send a time calibration command to a slave splicing screen; and receive, via the communication unit 3022, time calibration completion information sent by the slave splicing screen. After the time cablibration is completed, the first control unit 3024 is further configured to control, based on the predetermined time interval, the communication unit 3022 to send a specified play command to the slave splicing screen, so as to ensure play synchronization between splicing screens.

In some embodiments, when the splicing screen 302 sending a time calibration command at a predetermined time interval, the time calibration command will be sent repeatedly. Each time the time calibration command sent includes time calibration data corresponding to the splicing screen 302, that is, the time when the time calibration command is sent, to ensure that all the slave splicing screens can complete time synchronization.

In some embodiments, when the splicing screen 302 sends a specified play command at a predetermined time interval, the specified play command is sent repeatedly, to ensure that each slave splicing screen can receive the specified play command.

In some embodiments, the control unit 3026 of the splicing screen 302 may also send an overrun prompt to the control unit 3024 when the amount of the display data stored in the DDR 3032 is higher than a third threshold $F_{MAX}$. The third threshold $F_{MAX}$ is an upper limit (for example, 30 frames) of a storage threshold of the DDR 3032, and the third threshold $F_{MAX}$ is greater than the second threshold $F_{MID1}$. After receiving the overrun prompt, the control unit 3024 stops sending the display data 402 to the control unit 3026 to prevent data packet loss on the control unit 3026 side.

Similarly, the control unit 3046 of the splicing screen 304 may also send an overrun prompt to the control unit 3044 when the amount of the display data stored in the DDR 3052 is higher than the third threshold $F_{MAX}$. The third threshold $F_{MAX}$ is an upper limit (for example, 30 frames) of a storage threshold of the DDR 3052, and the third threshold $F_{MAX}$ is greater than the second threshold $F_{MID1}$. After receiving the overrun prompt, the control unit 3044 stops sending the display data 404 to the control unit 3046 to prevent data packet loss on the control unit 3046 side. Similarly, the splicing screens 306 and 308 can also be processed similarly, which is not repeatedly herein.

After the control unit 3044 stops sending the display data 404 to the control unit 3046, the amount of data stored in the DDR 3032 gradually decreases as the control unit 3046 still continues controlling the display panel for display.

In some embodiments, when the data amount of the display data stored in the DDR 3032 is less than a fourth threshold $F_{MID2}$, the control unit 3026 may also send a recovery prompt to the control unit 3024. The fourth threshold $F_{MID2}$ is a second intermediate value (for example, 15 frames) of a storage threshold of the DDR 3032, and the fourth threshold $F_{MID2}$ is less than the second threshold $F_{MID1}$ and the fourth threshold $F_{MID2}$ is greater than the first threshold $F_{MIN}$. After receiving the recovery prompt, the control unit 3024 may continue to send the display data 402 to the control unit 3026.

Similarly, the control unit 3046 of the splicing screen 304 may send a recovery prompt to the control unit 3044 when the data amount of the display data stored in the DDR 3032 is less than the fourth threshold $F_{MID2}$. The fourth threshold $F_{MID2}$ is a second intermediate value (for example, 15 frames) of a storage threshold of the DDR 3052, and the fourth threshold $F_{MID2}$ is less than the second threshold $F_{MID1}$ and the fourth threshold $F_{MID2}$ is greater than the first threshold $F_{MIN}$. After receiving the recovery prompt, the control unit 3044 may continue to send the display data 404 to the control unit 3046.

In some embodiments, both the overrun prompt and the recovery prompt can be sent through the inter-chip communication mechanism, the communication mechanism is not limited herein, and may be serial or parallel.

The splicing screen system provided by the embodiments of the present disclosure can use a cloud splicing solution to allow multiple splicing screens to play videos simultaneously without connecting via splicers. In some embodiments, a heterogeneous system composed of SOC+FPGA controls a synchronous splicing display system. The manner of synchronization by the SOC and synchronously playing video with frame accuracy by FPGA solves the problem of how to achieve error correction when the multi-screen display is not synchronized and how to trigger and control multiple splicing screens synchronously. The splicing screen system provided by the embodiment of the present disclosure is simple to implement and has a good synchronization effect.

Figure 6:
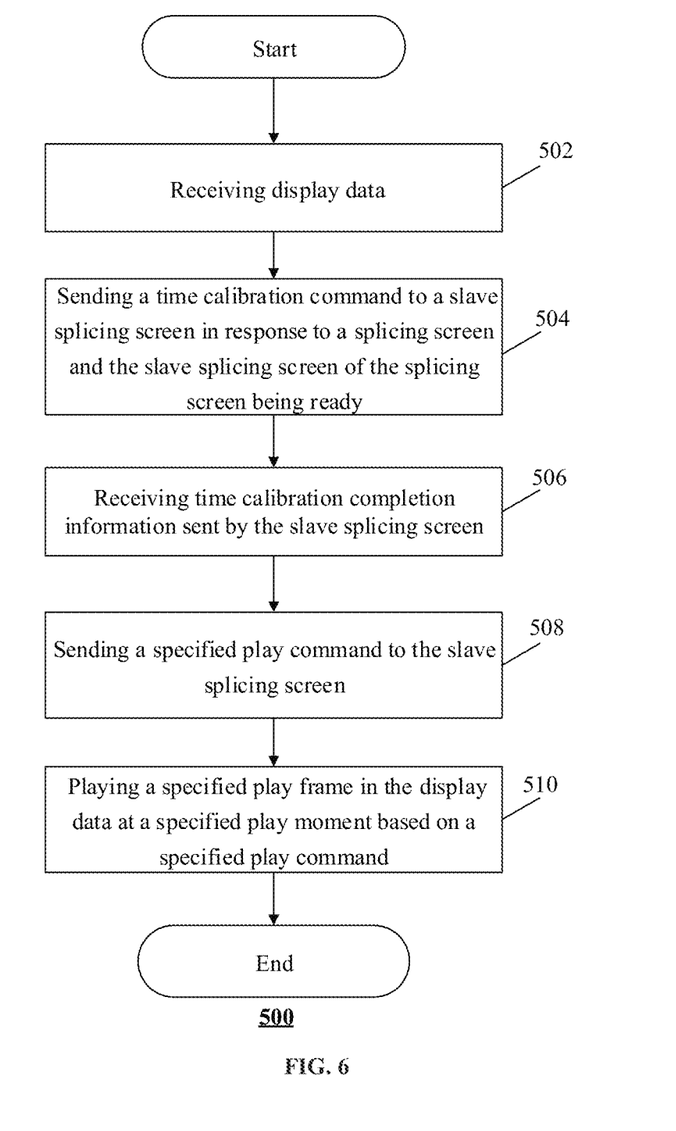
FIG. 6 is a flowchart showing a method for controlling a splicing screen according to some embodiments of the present disclosure.

FIG. 6 is a flowchart showing a method 500 for controlling a splicing screen according to some embodiments of the present disclosure. The method 500 may be realized by the splicing screen 302 shown in FIG. 5, and the method 500 may include the following steps.

In step 502, the splicing screen 302 may receive display data 402.

In step 504, in response to the splicing screen 302 and the slave splicing screens (for example, the splicing screens 304, 306, and 308 in FIG. 4) being ready (for example, the control unit 3024 receives a ready command sent by the control unit 3026 and ready commands sent by the slave splicing screens 304, 306, and 308), the splicing screen 302 may send a time calibration command to slave splicing screens.

In step 506, the splicing screen 302 may receive time calibration completion information sent by slave splicing screens.

In step 508, the splicing screen 302 may send a specified play command to the slave splicing screen, and the specified play command instructs to play a specified play frame in the display data at a specified play moment.

Exemplarily, the specified play command includes a specified play moment and a specified play frame.

In step 510, the splicing screen 302 may play the specified play frame in the display data 402 at the specified play moment based on the specified play command.

It should be noted that in other embodiments, in response to the splicing screen 302 and the slave splicing screens (for example, the splicing screens 304, 306, and 308) being ready, steps 508 and 510 may be directly executed.

In some embodiments, the splicing screen 302 includes a control unit 3024, a control unit 3026, and a memory DDR 3032. The method 500 further includes that:

in response to the data amount of display data stored in the memory being less than a first threshold, the control unit 3026 sends a not-ready command to the control unit 3024; and in response to receiving the not-ready command, the control unit 3024 determines that the splicing screen is not ready, and sends a play stop command to the slave splicing screens 304, 306, and 308.

In some embodiments, the method 500 further includes that:

after the control unit 3026 sends a not-ready command to the control unit 3024, in response to the data amount of the display data stored in the DDR 3032 being greater than a second threshold, the control unit 3026 sends a ready command to the control unit 3024, and the second threshold is greater than the first threshold; and in response to receiving the ready command, the control unit 3024 determines that the splicing screen 302 is ready.

In some embodiments, the method 500 further includes that:

in response to the data amount of the display data stored in the DDR 3032 being greater than a third threshold, the control unit 3026 sends an overrun prompt to the control unit 3024, and the third threshold is greater than the second threshold; and in response to receiving the overrun prompt, the control unit 3024 stops sending the display data 402 to the control unit 3026.

In some embodiments, the method 500 further includes that:

after the control unit 3026 sends an overrun prompt to the control unit 3024, in response to the data amount of the display data stored in the DDR 3032 being less than a fourth threshold, the control unit 3026 sends a recovery prompt to the control unit 3024; the fourth threshold is less than the second threshold, and the fourth threshold is greater than the first threshold; and in response to receiving the recovery prompt, the control unit 3024 continues to send the display data 402 to the control unit 3026.

In some embodiments, a slave splicing screen includes a first splicing screen 304 and a second splicing screen 306. The method 500 may further include that:

in response to receiving a not-ready command sent by the first splicing screen 304 or the second splicing screen 306, the control unit 3024 determines that the first splicing screen 304 or the second splicing screen 306 is not ready, and sends a play stop command to the first splicing screen 304 and the second splicing screen 306.

That is, the method 500 further includes: sending, by the control unit 302, a play stop command to all the slaving splicing screens in response to receiving a not-ready command sent by any of the slave splicing screens.

In some embodiments, the method 500 further includes:
sending, by the control unit 3024, a time calibration command to the slave splicing screens 304, 306, and 308 based on a predetermined time interval, and receiving, via the communication unit, time calibration completion information sent by the slave splicing screens 304, 306, and 308.

In some embodiments, the method 500 further includes:
controlling, based on a predetermined time interval, the communication unit to send a specified play command to the slave splicing screens 304, 306, and 308.

In some embodiments, the method 500 further includes:
marking, by the control unit 3026, the current playing frame and recording the number of frames of the display data 402 stored in the DDR 3032.

In some embodiments, the method 500 further includes:
determining, by the control unit 3026, based on the display command and combined with the marked current play frame, a frame number of the display data stored in the DDR 3032 corresponding to the specified play frame.

Figure 7:
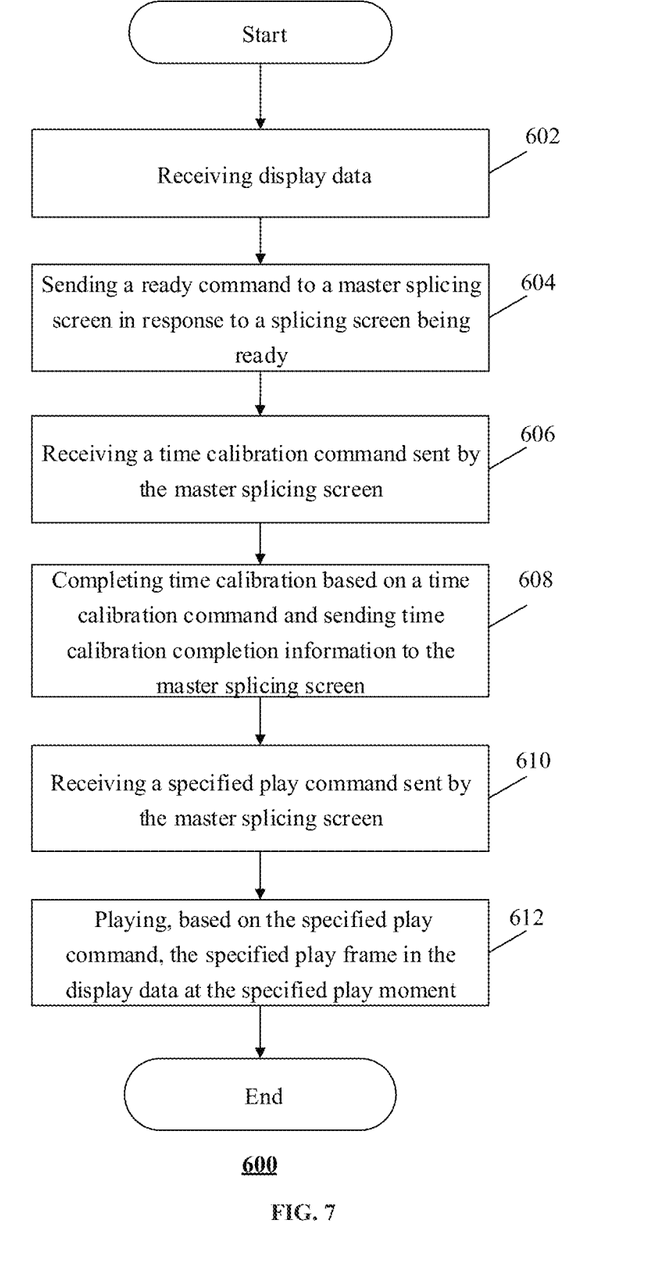
FIG. 7 is another flowchart showing a method for controlling a splicing screen according to some embodiments of the present disclosure.

FIG. 7 is a flowchart showing a method 600 for controlling a splicing screen according to some embodiments of the present disclosure. The method 600 may be implemented by a splicing screen 304 shown in FIG. 5, and the method 600 may include the following steps.

In step 602, the splicing screen 304 may receive display data 404.

In step 604, in response to the splicing screen 304 being ready (for example, a control unit 3044 receives a ready command sent by a control unit 3046), a ready command is sent to the splicing screen 302.

In step 606, a time calibration command sent by a master splicing screen 302 is received.

In step 608, the splicing screen 304 may complete time calibration based on the time calibration command and send time calibration completion information to the master splicing screen 302.

In step 610, the splicing screen 304 may receive a specified play command sent by the master splicing screen 302, and the specified play command instructs to play a specified play frame in the display data 404 at a specified play moment.

Exemplarily, the specified play command includes the specified play moment and the specified play frame.

In step 612, the splicing screen 304 may play, based on the specified play command, the specified play frame in the display data 404 at the specified play moment.

It should be noted that in other embodiments, step 606 and step 608 may be omitted.

In some embodiments, the splicing screen 304 includes a control unit 3044, a control unit 3046, and a memory DDR 3052. The method 600 further includes:
sending, by the control unit 3046, a not-ready command to the control unit 3044 in response to the data amount of the display data stored in the DDR 3052 being less than a first threshold; and
determining, by the control unit 3044 in response to receiving the not-ready command, that the splicing screen 304 is not ready and sending the not-ready command to the master splicing screen 302.

In some embodiments, the method 600 further includes:
after sending the not-ready command to the control unit 3044, sending, by the control unit 3046, a ready command to the control unit 3044 in response to the data amount of the display data stored in the DDR 3052 being greater than a second threshold, where a second threshold is greater than the first threshold; and
determining, by the control unit 3044 in response to receiving the ready command, that the splicing screen 304 is ready, and sending the ready command to the splicing screen 302.

In some embodiments, the method 600 further includes:
sending, by the control unit 3046, an overrun prompt to the control unit 3044 in response to the data amount of the display data stored in the DDR 3052 being greater than a third threshold, where the third threshold is greater than the second threshold; and
stopping sending, by the control unit 3044, the display data 404 to the control unit 3046 in response to receiving the overrun prompt.

In some embodiments, the method 600 further includes:
after the control unit 3046 sends the overrun prompt to the control unit 3044, sending, by the control unit 3046, a recovery prompt to the control unit 3044 in response to the data amount of the display data stored in the DDR 3052 being less than a fourth threshold, where the fourth threshold is greater than the second threshold, and the fourth threshold is less than the third threshold; and
continuing sending, by the control unit 3044, the display data 404 to the control unit 3046 in response to receiving the recovery prompt.

In some embodiments, the method 600 further includes:
receiving, by the control unit 3044, a time calibration command sent by a master splicing screen 302 based on a predetermined time interval; completing time calibration based on the time calibration command; and sending time calibration completion information to the master splicing screen via the communication unit.

In some embodiments, the method 600 further includes:
receiving a play stop command sent by a master splicing screen 302, where the play stop command is sent by the master splicing screen 302 after receiving a not-ready command sent by any of the slave splicing screens.

In some embodiments, the method 600 further includes:
marking, by the control unit 3046, a current play frame, and recording a number of frames of the display data stored in the memory.

In some embodiments, the method 600 further includes:
determining, based on the display command and combined with the current play frame, a frame number of the display data stored in the DDR 3052 corresponding to the specified play frame.

Those of ordinary skill in the art should understand that the discussion of any of the above embodiments is only exemplary, and is not intended to imply that the scope of the present disclosure (including the claims) is limited to these examples. Under the idea of the present disclosure, the technical features in the above embodiments or different embodiments can also be combined, and the steps can be implemented in any order. There are many other variations in different aspects of the embodiments of the present disclosure as described above, and they are not provided in the details for the sake of brevity.

In addition, in order to simplify the description and discussion, and in order not to make the embodiments of the present disclosure difficult to understand, the well-known power/ground connections to integrated circuit (IC) chips and other components may or may not be shown in the provided drawings. In addition, the device may be shown in the form of a block diagram in order to avoid making the embodiments of the present disclosure difficult to understand, and this also takes into consideration the following facts. That is, the details of the implementation of these block diagram devices are highly dependent on the platform on which the embodiments of the present disclosure will be implemented (that is, these details should be fully within the understanding of those skilled in the art). In the case where specific details (for example, a circuit) are described to describe exemplary embodiments of the present disclosure, it is obvious to those skilled in the art that the embodiments of the present disclosure may be implemented without these specific details or when these specific details are changed. Therefore, these descriptions should be considered illustrative rather than restrictive.

Although the present disclosure has been described in conjunction with specific embodiments of the present disclosure, according to the foregoing description, many substitutions, modifications and variations of these embodiments will be obvious to those of ordinary skill in the art. For example, other memory architectures (e.g., dynamic RAM (DRAM)) can use the discussed embodiments.

The embodiments of the present disclosure are intended to cover all such substitutions, modifications, and variations that fall within the broad scope of the appended claims. Therefore, any omission, modification, equivalent replacement, improvement, etc. made within the spirit and principle of the embodiments of the present disclosure should be included in the protection scope of the present disclosure.

What is claimed is:

1. A splicing screen, being a master splicing screen in a splicing screen system, wherein the splicing screen system comprises a control device, the master splicing screen, and a plurality of slave splicing screens, the control device directly communicating with each of the master splicing screen and the plurality of slave splicing screens, and the master splicing screen directly communicating with each of the plurality of slave splicing screens, the master splicing screen comprising:

a display panel;

a communication unit, configured to:
receive display data, wherein the display data is acquired by the control device by splitting data to-be-displayed based on a quantity of splicing screens in the splicing screen system and is sent by the control device to the master splicing screen; and
receive a ready command sent by the slave splicing screen of the master splicing screen; and a control unit, configured to control, in response to determining that the master splicing screen is ready and receiving the ready command from each of the plurality of slave splicing screens, the communication unit to send a specified play command to each of the plurality of slave splicing screens, wherein the specified play command instructs to play a specified play frame in the display data at a specified play moment; and control the display panel to display the specified play frame at the specified play moment;

wherein the control unit comprises a first control unit and a second control unit; wherein the first control unit is configured to send the display data received by the communication unit to the second control unit; control, in response to receiving a ready command sent by the second control unit and the ready command sent by each of the plurality of slave splicing screens, the communication unit to send the specified play command to each of the plurality of slave splicing screens; and send a display command to the second control unit at the specified play moment, wherein the display command instructs to display the specified play frame;

the second control unit is configured to control, based on the display command, the display panel to display the specified play frame;

the first control unit is further configured to control, in response to receiving a not-ready command sent by any of the slave splicing screens, the communication unit to send a play stop command to all the slave splicing screens and the second control unit;

the first control unit is further configured to control, at a predetermined time interval, the communication unit to send time calibration commands to the slave splicing screens, wherein the time calibration command is implemented in the form of a heartbeat packet and carrying a local time of the master splicing screen, and the time calibration command causes the slave splicing screen to: judge whether a difference between a local time of the slave splicing screen and the local time of the master splicing screen in the time calibration command exceeds a threshold; in the case that the difference exceeds the threshold, correct the local time of the slave splicing screen to the time in the time calibration command, and then return a time calibration completion information to the master splicing screen; and in the case that the difference does not exceed the threshold, directly return the time calibration completion information to the master splicing screen;

the first control unit is further configured to repeatedly send, upon receiving the time calibration completion information from the slave splicing screens, the specified play command at a predetermined time interval to the slave splicing screens by controlling the communication unit; and the second control unit is further configured to mark a current playing frame and record a number of frames of the display data stored in the memory; determine, based on the display command and the marked current playing frame, a corresponding frame number of the specified play frame in the display data stored in the memory; and extract, based on the corresponding frame number, a corresponding frame from the memory for playing.

2. The splicing screen according to claim 1, further comprising a memory configured to store the display data received by the second control unit; wherein the second control unit is further configured to send a not-ready command to the first control unit in response to a data amount of the display data stored in the memory being less than a first threshold; and the first control unit is further configured to control, in response to receiving the not-ready command, the communication unit to send a play stop command to the slave splicing screen.

3. The splicing screen according to claim 2, wherein the second control unit is further configured to send, after sending the not-ready command to the first control unit, a ready command to the first control unit in response to the data amount of the display data stored in the memory being greater than a second threshold, wherein the second threshold is greater than the first threshold.

4. The splicing screen according to claim 3, wherein the second control unit is further configured to send an overrun prompt to the first control unit in response to the data amount of the display data stored in the memory being larger than a third threshold, wherein the third threshold is larger than the second threshold;

the first control unit is configured to stop sending the display data to the second control unit in response to receiving the overrun prompt.

5. The splicing screen according to claim 4, wherein the second control unit is further configured to send, after sending the overrun prompt to the first control unit, a recovery prompt to the first control unit in response to the data amount of the display data stored in the memory being less than a fourth threshold, wherein the fourth threshold is less than the second threshold, and the fourth threshold is larger than the first threshold;

the first control unit is configured to continue to send the display data to the second control unit in response to receiving the recovery prompt.

6. A method for controlling a splicing screen, applicable to control the splicing screen of claim 1, wherein the method comprises:

receiving display data;

receiving, in response to determining that the splicing screen is ready, a ready command sent by a slave splicing screen of the splicing screen;

sending a specified play command to the slave splicing screen, wherein the specified play command instructs to play a specified play frame in the display data at a specified play moment; and playing the specified play frame at the specified play moment.

7. A splicing screen, being a slave splicing screen in a splicing screen system, wherein the splicing screen system comprises a control device, a master splicing screen, and a plurality of slave splicing screens, the control device directly communicating with each of the master splicing screen and the plurality of slave splicing screens, and the master splicing screen directly communicating with each of the plurality of slave splicing screens, the slave splicing screen comprising:

a display panel;

a communication unit, configured to:

receive display data, wherein the display data is acquired by the control device by splitting data to-be-displayed based on a quantity of splicing screens contained in the splicing screen system and is sent by the control device to the slave splicing screen; and receive a specified play command, wherein the specified play command instructs to play a specified play frame in the display data at a specified play moment and is sent by the master splicing screen to which the slave splicing screen belongs upon the master splicing screen determining that the master splicing screen is ready and receiving a ready command sent by each of the plurality of slave splicing screens of the master splicing screen; and a control unit, configured to control, based on the specified play command, the display panel to display the specified play frame at the specified play moment;

wherein the control unit comprises a first control unit and a second control unit; wherein the first control unit is configured to send the display data received by the communication unit to the second control unit; send, in response to the communication unit receiving the specified play command, a display command to the second control unit at the specified play moment based on the specified play command, wherein the display command instructs to display the specified play frame;

the second control unit is configured to control, based on the display command, the display panel to display the specified play frame;

the first control unit is further configured to receive, by the communication unit, a play stop command sent by the master splicing screen, wherein the play stop command is sent by the master splicing screen upon the master splicing screen receiving a not-ready command sent by any of the slave splicing screens;

the first control unit is further configured to receive, by the communication unit, a time calibration command sent by the master splicing screen at a predetermined time interval, wherein the time calibration command is implemented in the form of a heartbeat packet and carrying a local time of the master splicing screen; judge, based on the time calibration command, whether a difference between a local time of the slave splicing screen and the local time of the master splicing screen in the time calibration command exceeds a threshold; in the case that the difference exceeds the threshold, correct the local time of the slave splicing screen to the time in the time calibration command, and then return a time calibration completion information to the master splicing screen; and in the case that the difference does not exceed the threshold, directly return the time calibration completion information to the master splicing screen; and the second control unit is further configured to mark a current playing frame and record a number of frames of the display data stored in the memory; determine, based on the display command and the marked current playing frame, a corresponding frame number of the specified play frame in the display data stored in the memory; and extract, based on the corresponding frame number, a corresponding frame from the memory for playing.

8. The splicing screen according to claim 7, further comprising a memory, wherein the memory is configured to store the display data received by the second control unit;

the second control unit is further configured to send a not-ready command to the first control unit in response to a data amount of the display data stored in the memory being less than a first threshold; and the first control unit is further configured to control, in response to receiving the not-ready command, the communication unit to send the not-ready command to the master splicing screen.

9. The splicing screen according to claim 8, wherein the second control unit is further configured to send, in response to the data amount of the display data stored in the memory being greater than a second threshold, a ready command to the first control unit upon sending the not-ready command to the first control unit wherein the second threshold is greater than the first threshold;

the first control unit is further configured to send, in response to receiving the ready command, the ready command to the master splicing screen.

10. The splicing screen according to claim 9, wherein the second control unit is further configured to send an overrun prompt to the first control unit in response to the data amount of the display data stored in the memory being larger than a third threshold, wherein the third threshold is larger than the second threshold;

the first control unit is further configured to stop sending the display data to the second control unit in response to receiving the overrun prompt.

11. The splicing screen according to claim 10, wherein the second control unit is further configured to send, in response to the data amount of the display data stored in the memory being less than a fourth threshold, a recovery prompt to the first control unit upon sending the overrun prompt to the first control unit, wherein the fourth threshold is less than the second threshold, and the fourth threshold is larger than the first threshold;

the first control unit is further configured to continue to send the display data to the second control unit in response to receiving the recovery prompt.

12. A method for controlling a splicing screen, applicable to control the splicing screen of claim 10, wherein the method comprises:

receiving display data;

receiving a specified play command, wherein the specified play command instructs to play a specified play frame in the display data at a specified play moment, and the specified play command is sent by a master splicing screen to which the splicing screen belongs, upon determining that the master splicing screen is ready and receiving a ready command sent by a slave splicing screen of the master splicing screen; and playing the specified play frame at the specified play moment based on the specified play command.

13. A splicing screen system, comprising a control device and a plurality of splicing screens, the plurality of splicing screens comprising a master splicing screen and a plurality of slave splicing screens, the control device directly communicating with each of the master splicing screen and the plurality of slave splicing screens, and the master splicing screen directly communicating with each of the plurality of slave splicing screens, wherein the control device is configured to determine data to-be-displayed, obtain display data of each splicing screen by splitting the data to-be-displayed based on a quantity of splicing screens contained in the splicing screen system; and send the display data to corresponding splicing screens;

the slave splicing screen is configured to receive the display data sent by the control device and send a ready command to the master splicing screen;

the master splicing screen is configured to receive the display data sent by the control device; receive the ready command sent by the slave splicing screen; send a specified play command to the slave splicing screen in response to determining that the master splicing screen is ready and receiving the ready command sent by each of the plurality of slave splicing screens, wherein the specified play command instructs to play a specified play frame in the display data at a specified play moment; and display the specified play frame at the specified play moment; and the slave splicing screen is further configured to receive the specified play command; and display the specified play frame at the specified play moment based on the specified play command;

wherein the slave splicing screen comprises a communication unit, a first control unit, and a second control unit, wherein the communication unit is configured to receive the display data sent by the control device; the first control unit is configured to send the display data received by the communication unit to the second control unit, and send, in response to the communication unit receiving the specified play command, a display command to the second control unit at the specified play moment based on the specified play command, wherein the display command instructs to display the specified play frame; the second control unit is configured to control, based on the display command, a display panel to display the specified play frame; the first control unit is further configured to receive, by the communication unit, a play stop command sent by the master splicing screen; the first control unit is further configured to receive, by the communication unit, a time calibration command sent by the master splicing screen at a predetermined time interval, wherein the time calibration command is implemented in the form of a heartbeat packet and carrying a local time of the master splicing screen; judge, based on the time calibration command, whether a difference between a local time of the slave splicing screen and the local time of the master splicing screen in the time calibration command exceeds a threshold; in the case that the difference exceeds the threshold, correct the local time of the slave splicing screen to the time in the time calibration command, and then return a time calibration completion information to the master splicing screen; and in the case that the difference does not exceed the threshold, directly return the time calibration completion information to the master splicing screen; and the second control unit is further configured to mark a current playing frame and record a number of frames of the display data stored in the memory; determine, based on the display command and the marked current playing frame, a corresponding frame number of the specified play frame in the display data stored in the memory; and extract, based on the corresponding frame number, a corresponding frame from the memory for playing; and the master splicing screen comprises a communication unit, a first control unit, and a second control unit, wherein the communication unit is configured to receive the display data sent by the control device; the first control unit is configured to send the display data received by the communication unit to the second control unit, control, in response to receiving a ready command sent by the second control unit and the ready command sent by each of the plurality of slave splicing screens, the communication unit to send the specified play command to each of the plurality of slave splicing screens, send a display command to the second control unit at the specified play moment, wherein the display command instructs to display the specified play frame; the second control unit is configured to control, based on the display command, a display panel to display the specified play frame; and the first control unit is further configured to control, in response to receiving a not-ready command sent by any of the slave splicing screens, the communication unit of the master splicing screen to send a play stop command to all the slave splicing screens and the second control unit of the master splicing screen; the first control unit is further configured to control, at a predetermined time interval, the communication unit to send time calibration commands to the slave splicing screens, wherein the time calibration command is implemented in the form of a heartbeat packet and carrying a local time of the master splicing screen, and the time calibration command causes the slave splicing screen to: judge whether a difference between a local time of the slave splicing screen and the local time of the master splicing screen in the time calibration command exceeds a threshold; in the case that the difference exceeds the threshold, correct the local time of the slave splicing screen to the time in the time calibration command, and then return a time calibration completion information to the master splicing screen; and in the case that the difference does not exceed the threshold, directly return the time calibration completion information to the master splicing screen; the first control unit is further configured to repeatedly send, upon receiving the time calibration completion information from the slave splicing screens, the specified play command at a predetermined time interval to the slave splicing screens by controlling the communication unit; and the second control unit is further configured to mark a current playing frame and record a number of frames of the display data stored in the memory; determine, based on the display command and the marked current playing frame, a corresponding frame number of the specified play frame in the display data stored in the memory; and extract, based on the corresponding frame number, a corresponding frame from the memory for playing.

* * * * *